(12) United States Patent
Defrank et al.

(10) Patent No.: US 10,107,707 B2
(45) Date of Patent: Oct. 23, 2018

(54) METHOD AND SYSTEM FOR DETECTION OF BLOWOUT IN PIPES/TUBES

(71) Applicant: JAIN IRRIGATION SYSTEMS LIMITED, Jalgaon, Maharashtra (IN)

(72) Inventors: Michael Patrick Defrank, Madera, CA (US); Ajit Bhavarlal Jain, Jalgaon (IN)

(73) Assignee: Jain Irrigation Systems Limited, Bambhori (IN)

( * ) Notice: Subject to any disclaimer, the term of this patent is extended or adjusted under 35 U.S.C. 154(b) by 41 days.

(21) Appl. No.: 15/031,932

(22) PCT Filed: Oct. 21, 2014

(86) PCT No.: PCT/IN2014/000669
§ 371 (c)(1),
(2) Date: Apr. 25, 2016

(87) PCT Pub. No.: WO2015/075737
PCT Pub. Date: May 28, 2015

(65) Prior Publication Data
US 2016/0273993 A1     Sep. 22, 2016

(30) Foreign Application Priority Data

Oct. 24, 2013   (IN) .......................... 3333/MUM/2013

(51) Int. Cl.
*B29C 47/00*     (2006.01)
*B29C 47/88*     (2006.01)
(Continued)

(52) U.S. Cl.
CPC .............. *G01M 3/083* (2013.01); *G01M 3/08* (2013.01)

(58) Field of Classification Search
CPC ......... B29C 47/00; B29C 47/88; B29C 47/92; B29D 23/00; G01M 3/08; G01M 3/083
See application file for complete search history.

(56) References Cited

U.S. PATENT DOCUMENTS 4,520,672 A * 6/1985 Saint-Amour .......... B29C 47/92
264/40.1
4,854,158 A     8/1989 Gates
(Continued)

FOREIGN PATENT DOCUMENTS

CN     102323012 A  *  1/2012  .............. G01M 3/08
WO     2012160121 A1    11/2012

OTHER PUBLICATIONS

International Search Report dated Jun. 29, 2015 for International Application No. PCT/IN14/00669, 3 pages.
(Continued)

*Primary Examiner* — Nguyen Ha
*Assistant Examiner* — 'Wyn' Ha
(74) *Attorney, Agent, or Firm* — McCarter & English, LLP; David R. Burns

(57) ABSTRACT

Disclosed is a method for detecting a blowout in an irrigation pipe being formed by an extrusion manufacturing process. The irrigation pipe is extruded. Further a positive air pressure inside the irrigation pipe may be created by circulating air through the irrigation pipe during the extrusion manufacturing process. The irrigation pipe with positive air pressure is then fed into a tank, wherein the tank comprises a coolant liquid. Further at least one air bubble is trapped at a surface of the tank.

2 Claims, 2 Drawing Sheets

(51) Int. Cl.
*B29C 47/92* (2006.01)
*G01M 3/08* (2006.01)

(56) References Cited

U.S. PATENT DOCUMENTS

| | | |
|---|---|---|
| 5,054,311 A | 10/1991 | Gates |
| 2006/0202381 A1 | 9/2006 | Bach et al. |
| 2014/0150509 A1* | 6/2014 | Wisler ................ B29C 47/0023 72/17.3 |

OTHER PUBLICATIONS

Written Opinion dated Jun. 29, 2015 for International Application No. PCT/IN14/00669, 4 pages.

* cited by examiner

METHOD AND SYSTEM FOR DETECTION OF BLOWOUT IN PIPES/TUBES

RELATED APPLICATIONS

This application is a 35 U.S.C. § 371 national stage filing of International Application No. PCT/IN2014/000669, filed on Oct. 21, 2014, which claims benefit of and priority to Indian Patent Application No. 3333/MUM/2013, filed on Oct. 24, 2013. The contents of each of the foregoing applications are hereby incorporated by reference in their entirety.

TECHNICAL FIELD

The present subject matter described herein, in general, relates to blowout in pipes or tubes, and more particularly to detection of blowout in pipes or tubes.

BACKGROUND

Blowouts are holes in pipes/tubes generally caused by foreign material in an extrudate, which forms the pipes/tubes, creating a weak or open area during a period of stretching and pulling as the extrudate enters the vacuum tank water bath before the extrudate cools off to finally the pipes/tubes.

Blowouts can be small micro perforations or huge holes that will actually rupture the pipes/tubes and stop the production line. The large holes that shut down the line are easy to detect, they are right at the tube break off point. The micro perforations are more difficult to find as they may simply run through the line undetected. A customer in the field may find them when the customer wants to carry out an irrigation project and turns the water on. Many blowouts detected at that time often manifest either as a geyser or a flooded pool. If the pipes/tubes are buried, as is often the case it is a long job digging in the mud to locate and repair every place where a blowout occurred. Since there is seldom a single occurrence of a blowout, the field could be littered with them, creating a tremendous amount of work for the customer, and a warranty nightmare for the manufacturer of the pipes/tubes.

SUMMARY

This summary is provided to introduce aspects related to a blowout detector for detecting blowouts or fault during the manufacturing of the pips/tubes. This summary is not intended to identify essential features of the claimed subject matter nor is it intended for use in determining or limiting the scope of the claimed subject matter.

In one implementation, a method for detecting a blowout in an irrigation pipe is disclosed. The method may comprise manufacturing by extruding the irrigation pipe. Further the method may further comprise creating a positive air pressure in the irrigation pipe during the manufacturing. The positive air pressure may be created by circulating air through the irrigation pipe being manufactured. The method may comprise feeding the irrigation pipe, with the positive air pressure, into a tank. The tank may comprise a coolant liquid. Further the method may comprise trapping and sensing at least one air bubble at a surface of the tank.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present subject matter discloses a blowout detector for detecting blowouts or fault during the manufacturing of the pips/tubes.

The method of detection of blowout employs a differential between a positive air pressure inside the pipe/tube and a negative pressure of a vacuum tank. When the vacuum tank is filled with cooling liquid, the positive air pressure inside the pipe/tube will push through the defect and create bubbles in the cooling fluid while pipe/tube travels a length of the vacuum tank. An apparatus captures a stream of these bubbles as the pipe/tube travels under it and feeds (funnels) these bubbles to a central area in the tank where they are allowed to break the surface of the cooling liquid. The bubbles break the cooling liquid surface inside a small diameter tube and are transported by the tube along with a quantity of the cooling liquid to a point where the bubbles can be detected by a sensor. An output signal can be set to sound an alarm, or stop production, or any other manner of alerting.

Figure 1:
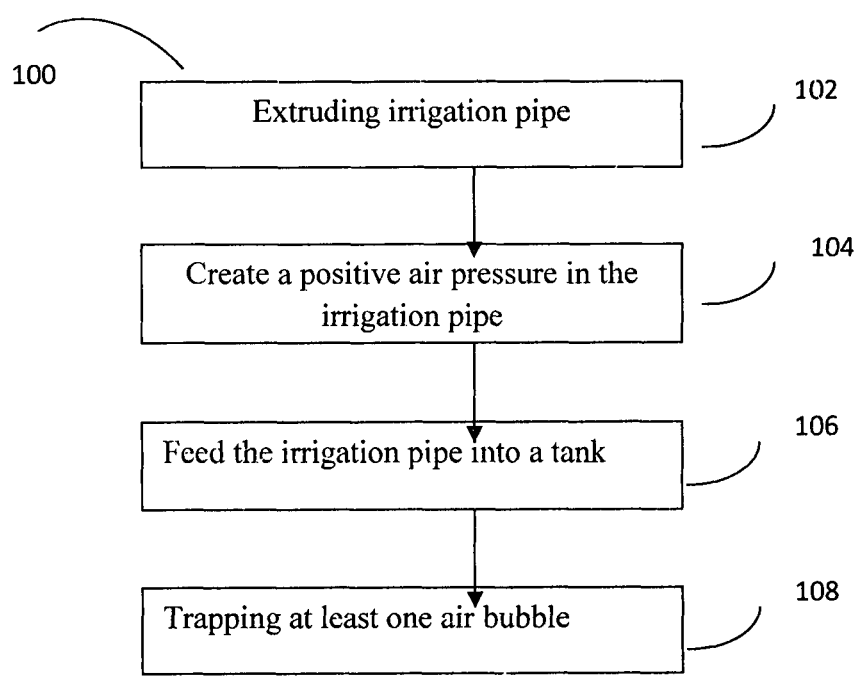
FIG. 1, illustrates a flow diagram for detecting a blowout in an irrigation pipe in accordance with an aspect of the present disclosure.

FIG. 1, illustrates a flow diagram for detecting a blowout in an irrigation pipe in accordance with an aspect of the present disclosure. The flow diagram 100 may comprise step 102, wherein the irrigation pipe may be extruded from a material like Polyvinyl chloride (PVC). At step 104, a positive air pressure may be created in the irrigation pipe by pumping air through the irrigation pipe. Further at the step 106 the irrigation pipe with the positive air pressure may be fed into a tank. The tank may comprise a cooling liquid, wherein the tank may be completely filled with the cooling liquid. The complete filing of tank with the cooling liquid may create a negative air pressure in the tank, due to absence of air. As the irrigation pipe is fed to the tank at step 108, any bubbles or at least one bubble escaping from the irrigation pipe may be trapped at a surface of the tank. The at least one bubble may originate from a blowout in the irrigation pipe, as the irrigation pipe has positive air pressure and the tank has negative air pressure. The at least one air bubble trapped on the surface of the tank may be further transferred to a sensor through a pipe or can be directly sensed at the surface. According to an exemplary embodiment a piezoelectric sensor may be used, or an ultrasonic sensor may be used. Further upon detection of the at least one air bubble an alert may be sent to a user or an operator.

Figure 2:
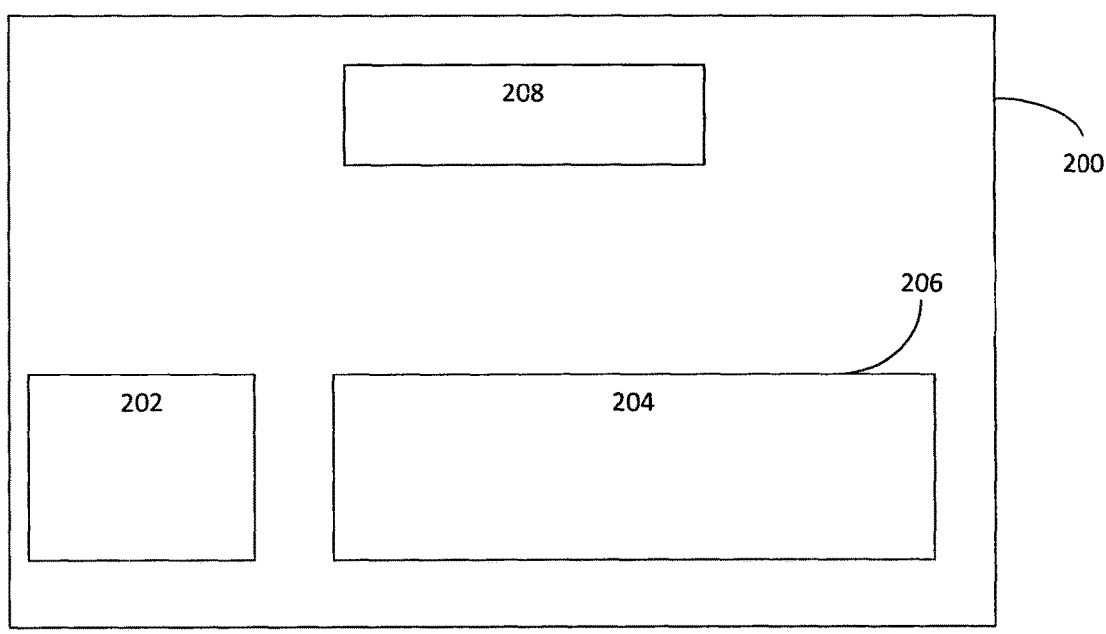
FIG. 2, illustrates a blowout detector in accordance with an aspect of the present disclosure.

FIG. 2, illustrates a blowout detector in accordance with an aspect of the present disclosure. The system 200, for detecting a blowout may comprise an extrusion machine 202. The extrusion machine may be configured to extrude pipes for irrigation. Any conventional machine may be used for this purpose. The extruded irrigation pipe may further be fed into a tank 206. The tank 206 may be filled with a coolant liquid 204. The system may further comprise a sensor 208. The sensor 208, may be configured to detect to any air bubble passing or traveling through the coolant liquid to surface of the tank. The sensor may then be enabled to alert a user or an operator of the system.

We claim:

1. A method for detecting a blowout in an irrigation pipe, the method comprising:
   extruding the irrigation pipe;
   creating a positive air pressure in the irrigation pipe, wherein the positive air pressure is created by circulating air through the irrigation pipe;
   feeding the irrigation pipe, with the positive air pressure, into a tank, wherein the tank comprises a coolant liquid; and
   trapping at least one air bubble at a surface of the tank by transferring the at least one bubble to the surface; and
   sensing of the at least one air bubble at the surface of the tank using a piezoelectric sensor, or an ultrasonic sensor.

2. The method for detecting the blowout in the irrigation pipe of claim 1, further comprising: alerting a user upon detection of the at least one air bubble.

* * * * *